United States Patent [19]
Browning et al.

[11] 3,901,822
[45] Aug. 26, 1975

[54] PROCESS OF REGENERATING A NOBLE METAL HYDROGENATION CATALYST USED IN HYDROGEN PEROXIDE PRODUCTION BY THE ANTHRAQUINONE PROCESS

[75] Inventors: Jhonce N. Browning, So. Charleston, W. Va.; Nathan D. Lee, Lambertville, N.J.; George H. Smee, So. Charleston, W. Va.

[73] Assignee: FMC Corporation, New York, N.Y.

[22] Filed: Nov. 14, 1973

[21] Appl. No.: 415,631

[52] U.S. Cl. .............. 252/412; 252/414; 252/416; 252/420; 423/588
[51] Int. Cl. .................. B01j 11/18; B01j 11/14
[58] Field of Search .......... 252/412, 413, 414, 416, 252/420; 423/588

[56] References Cited
UNITED STATES PATENTS

| | | | |
|---|---|---|---|
| 2,692,240 | 10/1954 | Sprauer | 252/414 |
| 3,112,278 | 11/1963 | Jenney et al. | 252/420 |
| 3,135,699 | 6/1964 | Herzog et al. | 252/412 |
| 3,694,376 | 9/1972 | Kabisch et al. | 252/413 |

FOREIGN PATENTS OR APPLICATIONS

| | | | |
|---|---|---|---|
| 635,870 | 2/1962 | Canada | 252/416 |

*Primary Examiner*—Winston A. Douglas
*Assistant Examiner*—P. E. Konopka

[57] ABSTRACT

This invention describes a process for regenerating deactivated noble metal hydrogenation catalysts to restore their catalytic activity. The process involves contacting a deactivated noble metal hydrogenation catalyst with a polar organic solvent, then contacting the solvent-treated catalyst with an aqueous ammonium hydroxide solution followed by contacting the ammonium hydroxide-treated catalyst with steam and an oxygen-containing gas at temperatures from about 250°C to the transition temperature of the catalyst crystal structure whereby the catalytic activity of the catalyst is substantially improved.

13 Claims, No Drawings

PROCESS OF REGENERATING A NOBLE METAL HYDROGENATION CATALYST USED IN HYDROGEN PEROXIDE PRODUCTION BY THE ANTHRAQUINONE PROCESS

This invention relates to the regeneration of noble metal hydrogenation catalysts used for producing hydrogen peroxide by the anthraquinone process.

It is known that anthraquinone compounds, e.g., ethylanthraquinone, and their tetrahydro derivatives can be used as working compounds in a process for producing hydrogen peroxide. In this process, commonly known as the anthraquinone process, an anthraquinone working compound is dissolved in a suitable solvent, or mixture of solvents, to form an anthraquinone working solution which is alternately reduced and oxidized. During the reducing stage, the working compound is hydrogenated in the presence of a catalyst to reduce it to its "hydroquinone" form. In the subsequent oxidation step, the hydrogenated working compound is oxidized with air or oxygen and converted to its "quinone" form while concomitantly forming hydrogen peroxide. The hydrogen peroxide product is then removed from the working solution, preferably by extraction with water, and the remaining working solution is recycled to the hydrogenator to again commence the process for producing hydrogen peroxide. The detailed operation of this process is described in U.S. Pat. Nos. 2,158,525, 2,215,883, and 3,009,782.

In the above described process, the catalytic hydrogenation is carried out in either a "fluid bed" or a "fixed bed". In a "fluid bed", the catalyst has a size of about 20 to 200 mesh and is kept suspended in a portion of the working solution which is maintained in the hydrogenator. The working solution and hydrogen gas are passed through the catalytic hydrogenator continuously while the suspended catalyst is mildly agitated to promote hydrogenation of the working solution. In a "fixed bed", the catalyst has a size of about 3 to 65 mesh, and is supported in a fixed position, preferably between porous support plates or screens. Both the working solution and hydrogen gas are passed simultaneously through the supported catalyst mass either concurrently or countercurrently. In this system, the catalyst is never suspended in the working solution.

It is well known that one of the major costs of operating an anthraquinone process for producing hydrogen peroxide is the cost of the catalyst. It is also well known that in the catalytic hydrogenation stage of such a process, the activity of the catalyst decreases with each cycle, until the yields of hydrogen peroxide per unit weight of catalyst are no longer economical. Accordingly, the catalyst must be either regenerated or replaced.

Various attempts have been made to develop methods of regenerating deactivated hydrogenation catalysts used in the anthraquinone process for producing hydrogen peroxide. U.S. Pat. No. 2,692,240 describes the regeneration of a hydrogenation catalyst which has become deactivated during use, by contacting the catalyst with an oxidizing agent such as hydrogen peroxide, an organic peracid, hypochlorite, or chlorites. Another process disclosed in U.S. Pat. No. 2,925,391 describes the regeneration of a hydrogenation catalyst which has become deactivated during use by treating the catalyst with a nonoxidizing aqueous alkaline solution, preferably at a pH greater than 12. These patented processes, however, suffer the disadvantages that they are either specific to certain special catalysts, or that they are not efficient in regenerating the catalyst so that the catalysts may be employed economically. Consequently, a generally applicable and efficient method of regenerating noble metal hydrogenation catalysts has been sought.

It has now been discovered, that deactivated noble metal hydrogenation catalysts used in a process of producing hydrogen peroxide, in which the catalysts are employed during the hydrogenation of an anthraquinone working compound, can be regenerated to a high level of activity by contacting the deactivated catalyst with a polar organic solvent containing 1 to 5 carbon atoms for about 0.1 to about 48 hours and separating the treated catalysts from the solvent; contacting the solvent-treated catalyst with at least a 1% aqueous ammonium hydroxide solution for about 0.1 to about 48 hours and separating the catalyst from the ammonium hydroxide solution; and then contacting the ammonium hydroxide-treated catalyst with steam and an oxygen-containing gas for about 1 to about 72 hours at temperatures from about 250°C to the transition temperature of the catalyst crystal structure. By this treatment, the initial activity of the catalyst is almost completely reactivated.

The catalysts which may be regenerated in accordance with the present method are the noble metal hydrogenation catalysts, namely: palladium; platinum; ruthenium; rubidium; rodium and iridium. The catalyst may be either unsupported on a carrier or supported on a carrier of sufficient particle size. The carrier can consist of alumina, silica gel, carbon, magnesium carbonate, dolomite and the like. Formation of these catalysts are old and is described in U.S. Pat. No. 3,635,841.

The regeneration procedure of this invention is preceded by separating the deactivated catalyst particles from the working solution by conventional means, such as filtration or decantation. Following this initial separation, the deactivated catalyst is contacted with a polar organic solvent which contains 1–5 carbon atoms. This initial contacting step removes any associated working solution and residual surface impurities present on the catalyst. The residual surface impurities consist mainly of by-product organic compounds readily soluble in the polar organic solvent, such as hydroxy substituted quinones and phenolics.

The amount of polar organic solvent necessary to contact the deactivated catalyst is that amount which permits substantially all of the catalyst surface to come in contact with the organic solvent. This contacting procedure may be conveniently achieved by either placing the catalyst in a vessel containing the organic solvent and submerging the catalyst therein or by other well known contacting procedures.

The time and temperature during which the catalyst contacts the organic solvent are not critical, and are determined by the amount of residual surface impurities to be removed. Generally, shorter times and lower temperatures remove less residual surface impurities than do longer times and higher temperatures. It has been found that a substantial portion of the residual surface impurities are removed from the catalyst when ambient temperatures are employed for about 0.1 to about 48 hours. Longer times may be employed even though they are not economical. Temperatures below or above ambient temperature and to the boiling point of the organic solvent may be employed. Temperatures above the boiling point should be avoided to prevent vaporization losses of the organic solvent when a reflux condenser is not employed.

Examples of polar organic solvents which contain 1-5 carbon atoms that are employed in the invention are: methanol, ethanol, n-propanol, n-butanol, isopropanol, isobutanol, sec-butanol, tert-butanol, allyl alcohol, crotyl alcohol, acetaldehyde, propionaldehyde, acetone, methyl ethyl ketone, formic acid, acetic acid, propionic acid, butyric acid, ethylene glycol, propylene glycol, 1,3-propanediol, 1,2-butanediol, meso-2,3-butanediol, 1,4-butanediol, glycerol, ethyl ether, and n-propyl ether. The most preferred polar organic solvent is methanol.

After the catalyst has been treated with solvent, organic solvent, the catalyst is separated from the organic solvent by conventional means, such as filtration or decantation. The separated catalyst may then be air dried for a few minutes so the catalyst can be handled easily and safely.

A preliminary, optional step which may be employed in the process of this invention is to contact the deactivated catalyst with a quinone solvent prior to contacting the catalyst with the polar organic solvent. The working solution and the quinone solvent are then recycled to the hydrogenator. Contacting the catalyst in this manner permits the recovery of the working solution adhering to the catalyst which would otherwise be discarded. This optional contacting step must be performed prior to contacting the catalyst with the polar organic solvent. The quinone solvent is preferably an aromatic compound, such as benzene or an alkyl substituted benzene. This contacting step is preferably carried out at ambient temperature and for about 0.1 to about 48 hours.

After the catalyst has been contacted with the polar organic solvent, and separated therefrom, the catalyst is contacted with an aqueous ammonium hydroxide solution. The contacting may be achieved by either immersing the catalyst in a vessel containing an aqueous ammonium hydroxide solution or by other conventional means. This contacting step removes adsorbed impurities from the catalyst. These adsorbed impurities include inorganic salts, trioctyl phosphate degradation products high in phosphorus, over-hydrogenated quinones, and quinone related compounds.

The ammonium hydroxide is employed in amounts that will maintain a basic pH condition throughout the entire contacting period. Concentrations of at least a 1% aqueous ammonium hydroxide solution and preferably a 1% to 30% aqueous ammonium hydroxide solution, and most preferably a 15% aqueous ammonium hydroxide solution have been found sufficient.

The time and temperature during which the catalyst contacts the ammonium hydroxide solution are not critical, and are determined by the amount of adsorbed impurities to be removed. Generally, shorter times and lower temperatures remove less adsorbed impurities than do longer times and higher temperatures. Contacting times of about 0.1 to about 48 hours and temperatures from about 0° to about 200°C, and preferably from about 30° to about 70°C, have been found sufficient to remove substantial amounts of adsorbed impurities from the catalyst. A preferred procedure is to contact the catalyst for about 0.1 to about 48 hours with a 1% to 30% aqueous ammonium hydroxide solution at temperatures of from about 30° to about 70°C.

The most preferred procedure of the invention is to contact the catalyst for about 0.1 to about 48 hours with a 15% aqueous ammonium hydroxide solution at temperatures from about 45° to about 55°C. Contacting may be done at atmospheric or superatmospheric pressures.

Following treatment of the catalyst with the aqueous ammonium hydroxide solution, the catalyst is separated from the solution by conventional means, such as filtration or decantation, and then washed with distilled water until the pH of the wash water is between 7 and 9. This washing step removes the ammonium hydroxide solution containing removed adsorbed impurities from the catalyst. After water washing the catalyst, the catalyst may be air dried for easy handling.

The final step of this invention involves contacting the catalyst with steam and an oxygen-containing gas at high temperatures for about 1 to about 72 hours. Treatment of the catalyst in this manner, results in the decomposition and vaporization of deeply penetrated adsorbed impurities. Removal of these impurities opens up and restores the initially active catalytic sites. This penetration is apparently facilitated by the steam which acts as a sweeping agent. Steam alone will not remove the high molecular weight residual organics present on the catalyst which have not been removed by prior processing steps. However, these high molecular weight organics are oxidatively degraded by the oxygen present in the oxygen-containing gas and swept away with the steam. Longer contacting times may be employed even though they are not economical.

The steam may be dry steam, that is, super-heated steam or wet-steam, that is, steam formed under superatmospheric pressure. The steam is heated to temperatures from about 250°C to the transition temperature of the catalyst crystal structure. The transition temperature of the catalyst crystal structure is that temperature at which the catalyst crystal is converted into another form. For example, the transition temperature of a palladium catalyst is about 380°C and the transition temperature of a platinum catalyst is about 590°C.

It is preferred to heat the catalyst gradually to a uniform temperature of about 250°C to the transition temperature of the catalyst crystal structure. Rapid heating should be avoided to prevent the formation of stresses within the catalyst support which could cause cleavage of the catalyst.

Temperatures above the transition temperature of the catalyst crystal structure must be avoided since these temperatures decrease catalytic activity by changing the structural form of the catalyst. For example, if a palladium catalyst is heated above about 380°C, or a platinum catalyst is heated above about 590°C, palladium and platinum crystallites will form on the catalyst surface. These crystallites decrease catalytic activity by covering portions of active or potentially active palladium or platinum. Temperatures below 250°C are not employed; these temperatures are not effective in decomposing deeply penetrated adsorbed impurities. When employing palladium or platinum catalysts, the most preferred contacting temperatures are from about 300° to about 350°C.

The term oxygen-containing gas means oxygen or a gas stream containing oxygen, such as air or ozone. The oxygen-containing gas is employed with steam in an amount to provide about 1% to 5% oxygen. Higher amounts of oxygen may be employed even though they are not desirable when employing palladium or platinum catalysts. Oxygen concentrations above 5% are undesirable because they may cause combustion of some of the residual organic impurities present on and penetrating through the catalyst surface. Combustion can immediately raise the contacting temperature to around 600°C. At this temperature palladium an platinum crystallites will form on the catalyst.

An alternative method for avoiding the combustion of the above residual organic impurities is to contact the catalyst with steam and an inert gas prior to treatment with steam and the oxygen-containing gas. This optional treatment may be employed for about 0.1 to about 48 hours at temperatures from about 250°C to the transition temperature of the catalyst crystal structure. At these times and temperatures a major portion, that is, 60% to 80%, of the remaining residual volatile impurities are removed from the catalyst. Any inert gas may be employed, for example, nitrogen or helium. Following the steam and inert gas treatment, the catalyst is subjected to the steam and oxygen-containing gas treatment discussed above.

Catalysts regenerated by the process of this invention have catalytic activities essentially equal to "broken in" new catalysts. The process for determining catalytic activity is set forth in Example 1. The expression "broken in" describes new catalysts which have been used until all the fine particle fractions of the catalysts have been removed and the catalytic activity reaches a steady state. Besides regeneration to a high level of catalytic activity, the process of this invention also increases the selectivity of the hydrogenation catalyst; that is, the inventive treatment increases the ability of the catalyst to hydrogenate an anthraquinone working compound to its hydroquinone form without concomitantly increasing the degree of conversion of the anthraquinone working compound to degradation products. This increase in selectivity is extremely important since it permits a catalyst to increase hydrogen peroxide yields without proportionately increasing the amount of degradation products obtained during catalytic hydrogenation.

The following examples are given to illustrate the invention, but are not deemed to be limiting thereof. All percentages given are based upon weight unless otherwise indicated.

EXAMPLE 1

A 200 ml (150 g) sample of a hydrogenation catalyst having a 50% catalytic activity comprising about 0.3% by weight palladium supported on delta-alumina spheres and having a particle size of about 10 mesh was removed from a commercially operated hydrogenator used in the process of producing hydrogen peroxide, wherein the catalyst contacts an anthraquinone working solution containing an anthraquinone working compound dissolved in a working solution during hydrogenation. The anthraquinone working solution contained 10% to 11% by weight of a mixture of 2-ethylanthraquinone and tetrahydro-2-ethylanthraquinone dissolved therein. The working solution contained about 75% by volume of a commercially available, mixed aromatic solvent containing about 99.6% aromatics having a boiling point range of 182° to 204°C obtained from Shell Chemical Company and identified as Shell Sol AB and had an aromatic content of about 82.3% $C_8$–$C_{12}$ alkyl benzene, 80% of which is $C_{10}$–$C_{11}$ alkyl benzene, and 13.3% cycloalkyl benzene, 3.5% $C_{10}$ diaromatic (naphthalene); the remaining solvent was 21%–28% by volume of trioctyl phosphate.

The above catalyst was then placed into a Soxhlet extractor which contained 300 ml of anhydrous methanol, and was continuously treated for 16 hours. The catalyst was then transferred to a vertically positioned glass tube measuring 2-inches in diameter. The bottom of the glass tube was fitted with a stainless steel endplate having a stainless steel needle valve. The top of the tube was then heated to 50°C with a heating tape and 500 ml of a 15% aqueous ammonium hydroxide solution was poured into the glass tube and over the catalyst. The needle valve was opened to permit the ammonium hydroxide solution to slowly pass over the catalyst. The ammonium hydroxide solution which had passed through the tube was collected and repeatedly passed through the tube to maintain a flooded condition over the catalyst. Treatment continued for 6 hours. Following the ammonium hydroxide treatment, distilled water was poured into the glass tube and over the catalyst until the pH of the effluent was below 9. Air was then passed through the tube until the catalyst was dry.

The chemically washed and dried catalyst was then transferred to a 1-inch ID quartz combustion tube and placed into a furnace. The furnace was then gradually heated to 300° to 350°C and simultaneously purged with preheated steam and nitrogen gas. The preheated steam was prepared from distilled water which was preheated to 300° to 350°C. The flow rate of the preheated steam through the combustion tube was equal to 3 liters of water per 16 hours. The flow rate of the nitrogen gas through the combustion tube was 200 to 400 ml/min. The catalyst was then treated for three hours at an operating temperature of 300° to 350°C. This time was sufficient to vaporize most of the volatile organics from the catalyst. After this treatment, the nitrogen flow was stopped and an air purge was begun at a flow rate of 200–400 ml/min for 16 hours at which time a characteristic odor from the vent end of the combustion tube had essentially subsided. The treatment was then stopped and the catalyst was dried.

The activity of the catalyst was then determined by the following procedure.

An anthraquinone working solution was made up by mixing together 75% by volume of a commercially available, mixed aromatic solvent containing about 99.6% aromatics having a boiling point range of 182° to 204°C obtained from Shell Chemical Company and identified as Shell Sol AB and having an aromatic content of about 82.3% $C_8$–$C_{12}$ alkyl benzene, 80% of which is $C_{10}$–$C_{11}$ alkyl benzene, and 13.3% cyclobenzene, 3.5% $C_{10}$ diaromatic (naphthalene), with 21 to 28% by volume trioctyl phosphate. Thereafter 10 to 11% by weight of 2-ethylanthraquinone was dissolved in the mixed solvent.

A fixed bed catalytic hydrogenator was prepared in a glass tube measuring 1-inch in diameter by placing 50 ml of the regenerated catalyst on a support screen in the glass tube. An excess of hydrogen gas and 1100 ml of the above anthraquinone working solution were cycled through the catalyst at 950 ml/min for one hour under a pressure of about 25 psig. The temperature in the fixed bed was maintained at about 50°C. The hydrogenated anthraquinone working solution recovered from the hydrogenator was pumped into an oxidizing vessel where the hydrogenated anthraquinone working solution was oxidized with oxygen for 10 to 20 minutes. Hydrogen peroxide was simultaneously released.

A 5 ml aliquot of the oxidized anthraquinone working solution containing hydrogen peroxide was transferred to a 125 ml flask containing 30 ml of cold 5% sulfuric acid solution and shaken for 15 seconds. Four drops of ferroin indicator solution was added to the flask and the extracted hydrogen peoxide was titrated with standardized 0.1 N ceric sulfate solution. Titration was continued until the aqueous color changes from orange to greenish blue.

The activity of the catalyst was then determined from its hydro-titer. The hydro-titer is defined as the volume of 0.5 N potassium permanganate solution (equal to 0.5 N ceric sulfate solution) required to react with the hydrogen peroxide extracted from 100 ml of oxidized working solution. Thus, a titer of 100 would indicate that 0.85 g of hydrogen peroxide can be recovered from every 100 ml of working solution passed through the oxidizer. Consequently, the hydro-titer is a function of catalytic activity since the hydro-titer represents the rate of hydrogenation of an anthraquinone working solution with a particular catalyst over a constant period of time.

The palladium catalyst regenerated according to Example 1 had a 95% catalytic activity based upon "broken in" new catalyst assigned an activity index of 100%. When this regenerated catalyst was reused in the anthraquinone process, the catalyst retained its catalytic activity for essentially the same length of time as the "broken in" new catalyst.

COMPARATIVE EXAMPLE A

The palladium catalyst of Example 1 was treated according to Example 1, except, the ammonium hydroxide treatment step was eliminated and the steam and air treatment were performed at 100°C in a furnace gradually heated to 100°C. The palladium catalyst treated in this manner had a 50% catalytic activity and no apparent regeneration of activity.

COMPARATIVE EXAMPLE B

The palladium catalyst of Example 1 was treated according to Example 1, except, the ammonium hydroxide treatment step was eliminated. The palladium catalyst treated in this manner had a 76% catalytic activity.

COMPARATIVE EXAMPLE C

The palladium catalyst of Example 1 was treated according to Example 1, except that air and steam was not used during the treatment. The palladium catalyst treated in this manner had a catalytic activity above 90%. However, when this catalyst was reused in the anthraquinone process, the catalytic activity of the catalyst was reduced to its preregeneration level within 4 days.

The invention being thus described, it will be obvious that the same may be varied in many ways. Such variations are not to be regarded as a departure from the spirit and scope of the invention, and all such modifications are intended to be included within the scope of the following claims.

What is claimed is:

1. Process of regenerating a deactivated noble metal hydrogenation catalyst used in the process of producing hydrogen peroxide, wherein said catalyst contacts an anthraquinone working compound dissolved in a working solution during hydrogenation of said compound, which comprises:
   contacting said deactivated catalyst with a polar organic solvent containing 1 to 5 carbon atoms for about 0.1 to about 48 hours to remove associated working solution and separating the treated catalyst from the solvent;
   contacting the solvent-treated catalyst with at least a 1% aqueous ammonium hydroxide solution for about 0.1 to about 48 hours at about 0° to about 200°C and separating the catalyst from the ammonium hydroxide solution; and
   contacting the ammonium hydroxide-treated catalyst with steam and an oxygen-containing gas at temperatures from about 250°C to the transition temperature of the catalyst crystal structure for about 1 to about 72 hours whereby the catalytic activity of said catalyst is improved.

2. The process of claim 1 in which the noble metal hydrogenation catalyst is selected from the group consisting of palladium, platinum, ruthenium, rubidium, rhodium and iridium.

3. The process of claim 1 in which the noble metal hydrogenation catalyst is palladium.

4. The process of claim 1 in which the noble metal hydrogenation catalyst is platinum.

5. The process of claim 1 in which the polar organic solvent is selected from the group consisting of methanol, ethanol, n-propanol, t-butanol, allyl alcohol, acetaldehyde, acetone, methyl ethyl ketone, formic acid, acetic acid, propionic acid, butyric acid, ethylene glycol, propylene glycol, 1,3-propanediol, meso-2,3-butanediol, 1,4-butanediol and glycerol.

6. The process of claim 1 in which the polar organic solvent is methanol.

7. The process of claim 1 in which the solvent-treated catalyst is treated with a 1% to 30% aqueous ammonium hydroxide solution at temperatures from about 30° to about 70°C.

8. The process of claim 1 in which the solvent-treated catalyst is treated with a 15% aqueous ammonium hydroxide solution at temperatures from about 45° to about 55°C.

9. The process of claim 3 in which the ammonium hydroxide-treated catalyst is contacted with steam and an oxygen-containing gas at temperatures from about 250° to about 380°C.

10. The process of claim 4 in which the ammonium hydroxide-treated catalyst is contacted with steam and an oxygen-containing gas at temperatures from about 250° to about 590°C.

11. The process of claim 1 in which the ammonium hydroxide-treated catalyst is contacted with steam and a sufficient amount of an oxygen-containing gas to provide 1% to 5% of oxygen.

12. The process of claim 1 in which the ammonium hydroxide-treated catalyst is contacted with steam and an inert gas at temperatures from about 250°C to the transition temperature of the catalyst crystal structure for about 0.1 to about 48 hours prior to contacting the catalyst with said steam and an oxygen-containing gas.

13. Process of regenerating a hydrogenation catalyst selected from the group consisting of palladium, and platinum used in the process of producing hydrogen peroxide, wherein said catalyst contacts an anthraquinone working compound dissolved in a working solution during hydrogenation of said compound, which comprises:

contacting said catalyst with methanol for about 0.1 to about 48 hours and separating the treated catalyst from the methanol;

contacting the methanol-treated catalyst with a 1% to 30% aqueous ammonium hydroxide solution at temperatures from about 30° to about 70°C for about 0.1 to about 48 hours and separating the catalyst from the ammonium hydroxide solution; and contacting the ammonium hydroxide-treated catalyst with steam and a sufficient amount of an oxygen-containing gas to provide 1% to 5% oxygen at temperatures from about 300° to about 350°C for about 1 to about 72 hours whereby the catalytic activity of said catalyst is improved.

* * * * *

UNITED STATES PATENT OFFICE
CERTIFICATE OF CORRECTION

PATENT NO. : 3,901,822
DATED : August 26, 1975
INVENTOR(S) : J. N. Browning, N. D. Lee & G. H. Smee It is certified that error appears in the above-identified patent and that said Letters Patent are hereby corrected as shown below:

Column 3, lines 15 and 16, "solvent, organic aolvent" should read --the organic solvent,--

Column 3, line 43 "im$_p$urities" should read --impurities--

Column 4, line 26, "rem$_o$ved" should read --removed--

Column 8, line 8, after "solution" insert --and residual surface impurities--

Signed and Sealed this

Third Day of August 1976

[SEAL]

Attest:

RUTH C. MASON
Attesting Officer

C. MARSHALL DANN
Commissioner of Patents and Trademarks